US006660206B1

(12) United States Patent
Matsushima et al.

(10) Patent No.: US 6,660,206 B1
(45) Date of Patent: Dec. 9, 2003

(54) METHOD OF MANUFACTURING A SEALING DEVICE

(75) Inventors: Noboru Matsushima, Fukushima (JP); Satoshi Yamanaka, Fukushima (JP)

(73) Assignee: NOK Corporation, Fukushima (JP)

( * ) Notice: Subject to any disclaimer, the term of this patent is extended or adjusted under 35 U.S.C. 154(b) by 80 days.

(21) Appl. No.: 09/722,403

(22) Filed: Nov. 28, 2000

Related U.S. Application Data

(62) Division of application No. 08/379,599, filed as application No. PCT/JP94/00905 on Jun. 3, 1994, now Pat. No. 6,182,975.

(30) Foreign Application Priority Data

Jun. 4, 1993 (JP) .............................................. 5-160228

(51) Int. Cl.[7] .......................... B29C 43/04; B29C 43/14
(52) U.S. Cl. .................... 264/255; 264/271.1; 264/295; 264/296
(58) Field of Search ................................. 264/255, 266, 264/271.1, 285, 294, 295, 296, 248, 249, 259, 267, 273, 274, 275, 279

(56) References Cited

U.S. PATENT DOCUMENTS

| | | | |
|---|---|---|---|
| 2,329,028 A | 9/1943 | Austin | 277/152 |
| 3,843,141 A * | 10/1974 | Kuhn | 277/595 |
| 3,857,156 A * | 12/1974 | Clark | 264/154 |
| 3,929,341 A * | 12/1975 | Clark | 264/295 |
| 3,939,551 A * | 2/1976 | Clark et al. | 264/296 |
| 4,038,359 A * | 7/1977 | Pendleton | 264/268 |
| 4,464,322 A * | 8/1984 | Butler | 264/138 |
| 4,555,376 A * | 11/1985 | Butler | 264/266 |
| 4,583,749 A | 4/1986 | Hatch | 277/152 |
| 4,613,143 A | 9/1986 | Butler | 277/134 |
| 4,709,930 A | 12/1987 | Forch | 277/152 |
| 4,723,350 A * | 2/1988 | Kobayashi et al. | 264/293 |
| 4,986,553 A | 1/1991 | Preston et al. | 277/134 |
| 5,052,696 A | 10/1991 | Hatch | 277/152 |
| 5,082,612 A * | 1/1992 | Butler et al. | 264/138 |
| 5,106,565 A * | 4/1992 | Saitoh | 264/268 |
| 5,149,106 A | 9/1992 | Takenaka et al. | |
| 5,209,502 A | 5/1993 | Savoia | 277/152 |
| 5,582,412 A | 12/1996 | Sabo Filho | |
| 5,607,168 A * | 3/1997 | Dahll | 264/268 |
| 5,884,919 A * | 3/1999 | Saito | 264/268 |
| 6,401,322 B1 * | 6/2002 | Matsushima | 264/320 |

FOREIGN PATENT DOCUMENTS

| | | |
|---|---|---|
| JP | 150658 | 11/1981 |
| JP | 150659 | 11/1981 |
| JP | 150661 | 11/1981 |
| JP | 223571 | 10/1991 |

* cited by examiner

*Primary Examiner*—Mark Eashoo
*Assistant Examiner*—Geoffrey P. Shipsides
(74) *Attorney, Agent, or Firm*—Armstrong, Westerman & Hattori

(57) ABSTRACT

A method of manufacturing a sealing device by preparing a mold for molding both a rubber-like elastic material and a resin material, the resin material having a flat washer shape, inserting an outer diameter portion of the resin material into a mold cavity of the mold, and adhesively baking the rubber-like elastic material to the outer diameter portion of the resin material together with the molding of the rubber-like elastic material. An inner diameter portion of the flat washer shape resin material is pressed by a mold part adjacent to the mold cavity in utilization of a mold clamping pressure, the pressed inner diameter portion of the resin material is bent at an elevated temperature by a mold part to form a resin lip, arranged so as to not interfere with the rubber seal lip, and the sealing device produced is separated from the mold.

4 Claims, 12 Drawing Sheets

FIG. 15
PRIOR ART
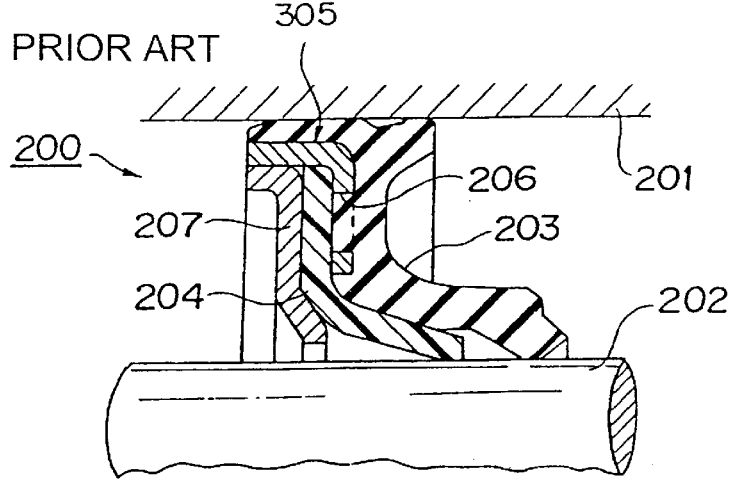
FIG. 16(a) PRIOR ART
FIG. 16(b) PRIOR ART
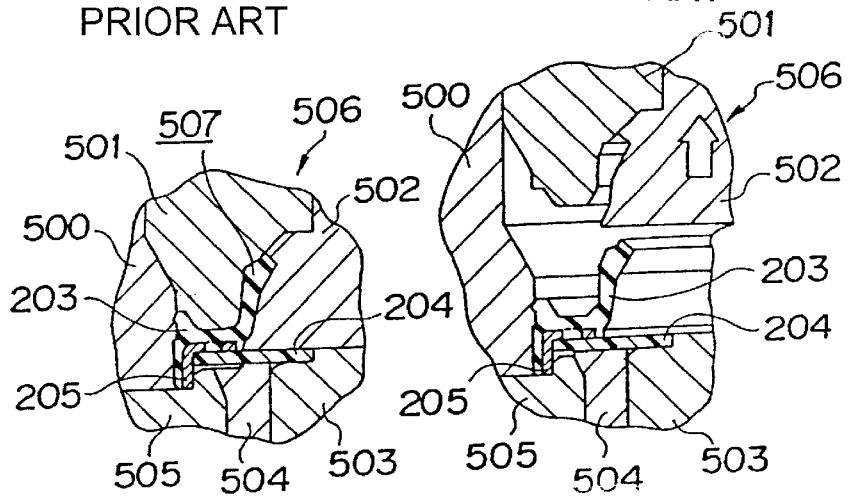
FIG. 16(c) PRIOR ART
FIG. 16(d) PRIOR ART
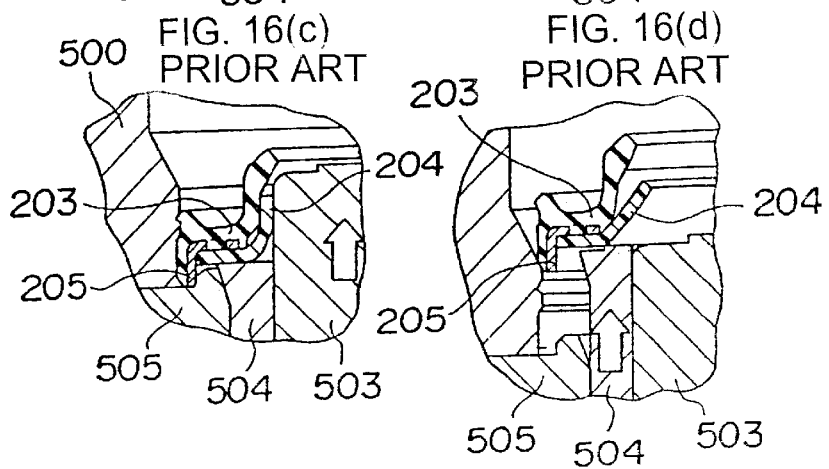

METHOD OF MANUFACTURING A SEALING DEVICE

This application is a division of prior U.S. patent application Ser. No. 08/379,599 filed Mar. 7, 1995, now U.S. Pat. No. 6,182,975 which is a 371 of PCT/JP94/00905 filed Jun. 3, 1994.

FIELD OF THE INVENTION

The present invention relates generally to a sealing device, and more particularly, to a compound-type sealing device having a combination of seal lips, wherein a first seal lip is formed of a rubber-like elastic material and a second seal lip is formed of a resin material, and to a method of manufacturing such a compound-type sealing device.

BACKGROUND OF THE INVENTION

It is well known in the art of sealing devices which have seal lips, to provide a sealing device which utilizes a seal lip formed of a rubber-like elastic material or a resin material such as PTFE (polytetrafluoroethylene). In a conventional sealing device where a seal lip formed only of a rubber-like elastic material is used, the seal lip may be damaged by contact with the fluid which is to be sealed, such as, oil or other chemicals. This may be very inconvenient. On the other hand, where a seal lip is used that is formed only of a resin material, the seal lip has the problem that the seal lip does not suitably follow-up the operation of a rotational shaft to be sealed due to a lack of elasticity of the resin of the seal lip and due to a leakage of fluid such as oil from a small gap.

The prior art has attempted to solve the aforementioned problems by providing a sealing device 100, as shown in FIG. 10, having only a resin seal lip 101, in which the elasticity of the resin seal lip 101 is improved.

In such a sealing device 100, the resin seal lip 101 has outer diameter side end portions 102 which are nip-supported by a pair of reinforcing rings 103 and 104. In order to improve the follow-up performance of the resin seal lip 101 to the rotation of the shaft and to prevent an oil leakage through the small gap, grooves 107 and 108 are formed so as to provide a bellows shape on the peripheral surfaces of the resin seal lip 101 on a side of the resin seal lip opposite the fluid to be sealed and on a side of the resin seal lip opposite a fluid side not to be sealed. These grooves 107 and 108 are formed by an upper die 111 and a lower die 112, as shown in FIG. 11, and are provided with mutually opposing projections 109 and 110 on the die's pressing surfaces so as to provide grooves 107 and 108 on the upper and lower surfaces of the seal lip 101 as shown in FIG. 12.

Although the resin seal lip 101 of the conventional sealing device 100 has improved elasticity, the improvement in the elasticity is limited. The resin seal lip 101 still does not have as much elasticity as that of the seal lip formed of the rubber-like elastic material.

Furthermore, a sealing device 400, such as is shown in FIG. 13, is also well known. The conventional sealing device 400 includes a resin liner 407 which is bonded on a sliding surface 405 of a seal lip 402 formed of a rubber-like elastic material extending from a seal body 401 to the side of the seal lip opposite the fluid side to be sealed. The sealing device 400 thereby provides the elasticity of the rubber-like elastic material and improves durability of the sliding surface. The liner 407 has a sliding surface 403 on which is formed a helical groove 403 having a pumping function.

In such a conventional sealing device 400, however, the unsolved problem is that oil leaks through the small gap between the resin liner 407 and the rotation shaft 406.

In order to prevent the problems encountered in both the above-described conventional sealing devices, there have been further proposed various sealing devices of a compound type. Compound type sealing devices have a combination of a seal lip formed of a rubber-like material reinforcing ring 205 and the back-up ring 207.

FIG. 16 illustrates manufacturing processes of the aforementioned integral-compound type sealing device.

That is, a resin material 204A for forming a resin seal lip 204 is disposed in a mold cavity 507 of a rubber formation mold 506 constructed by upper first and second mold parts 501 and 502 and lower first, second and third mold parts 503, 504 and 505. The reinforcing ring 205 having the perforations 206 is disposed on the resin material 204A so as to abut against it, and under this state, a rubber material is vulcanized for forming the seal lip 203 of the rubber-like elastic material. Simultaneously with the formation of the rubber seal lip 203, the rubber material is baked integrally with a portion of the resin material 204A intruded into the cavity 507 and bonded thereto (refer to FIG. 16(a)).

Thereafter, as shown in FIG. 16(b), the upper first and second mold parts 501 and 502 are opened (in the direction of the arrow) to open the mold 506, and as shown in FIG. 16(c), the lower mold part 503 is pushed up in the direction of the arrow to form a lip front end portion. Then, as shown in FIG. 16(d), the lower second mold part 504, against which are resin material 204A abuts, is pushed up in the direction of the arrow, thereby separating the mold product from the mold 506.

However, even in the conventional compound type sealing device described above, a side of the lip facing radially inwardly, facing the shaft and the resin lip 204 of the seal lip 203 formed of the rubber-like elastic material is disposed adjacent to the resin seal lip 204, so that the resin seal lip 204 interferes with the rubber seal lip 203, thus providing the problem of poor follow-up performance with respect to the rotation shaft 202.

Furthermore, countermeasures for preventing the rubber material from rotating during manufacturing as well as the problems of dimensional performance in the formation of the resin seal lip 204 should be considered.

An object of the present invention is to solve the problems encountered in the prior art described above. A further object of the present invention is to provide a sealing device of a compound type having a combination of a seal lip formed of a rubber-like elastic material and a resin seal lip. A further object of the present invention is to provide a method of manufacturing the compound type sealing device capable of preventing the resin seal lip from interfering with the rubber seal lip. A further object of the present invention is to effectively prevent the rubber material from intruding during the manufacturing process. A further object of the present invention is to make the thickness of the resin seal lip relatively thin in order to improve the follow-up performance of the resin seal lip. A further object of the present invention is to reduce heat generation. A further object of the invention is to form the resin seal lip simultaneously with the rubber seal lip molding process.

SUMMARY OF THE INVENTION

The present invention provides a sealing device for sealing two members which are disposed to be relatively rotated mutually concentrically, the sealing device being provided with a first seal member having a seal lip formed of a rubber-like elastic material and a second seal member having a seal lip formed of a resin material to be assembled integrally with the first seal member, and characterized in that an annular space is formed between the rubber seal lip and the resin seal lip so as to prevent the resin seal lip from interfering with the rubber seal lip.

Accordingly, the resin seal lip becomes flexible following up the operation of a shaft without interfering with the rubber seal lip, thus improving the sealing performance.

It is characterized in that the annular space is formed between the resin seal lip and a side of the lip facing radially inward, facing the shaft and the resin seal lip of the rubber seal lip. This is because, in a conventional product, the side of the lip facing radially inward, facing the shaft and facing the resin seal lip of the rubber seal lip is most interfered with.

It is characterized in that an annular groove is formed to a side surface on the side of said annular space of the resin seal lip.

It is characterized in that a plurality of the annular grooves are formed in an axial direction.

The annular groove maybe formed continuous or partially discontinuous on an entire peripheral surface of the resin seal lip.

According to the formation of these annular grooves, the resin seal lip is liable to be flexed and hence the follow-up performance can be improved.

On the other hand, a helical groove is formed on a side surface opposite to the side of the annular gap of the resin seal lip to improve the sealing performance of the resin seal lip.

It is characterized in that the first seal member is provided with a reinforcing ring to which the rubber seal lip is integrally bonded.

It is characterized in that a film formed of a rubber-like elastic material is formed on the side surface of the gap side of the resin seal lip so that the rubber film is branched from a base portion of the rubber seal lip of the first seal member continuously therefrom.

Furthermore, a method of manufacturing a sealing device is characterized by the steps of:
- preparing a mold for molding a rubber-like elastic material and a resin material having a flat washer shape;
- inserting an outer diameter portion of the resin material into a mold cavity, and adhesively baking the rubber-like elastic material to the outer diameter portion of the resin material together with the molding of the rubber-like elastic material;
- pressing an inner diameter portion of the flat washer shape resin material by a mold part adjacent to the mold cavity in utilization of a mold clamping pressure; and
- bending the pressed inner diameter portion of the resin material under high temperature condition when a mold product is separated from the mold thereby to form a resin seal lip.

An annular projection is formed to an upper mold part to be pressed to form an annular groove to the upper surface of the resin material at a time when the inner diameter portion of the flat washer shape resin material is pressed to prevent the intrusion of the rubber material. Accordingly, it is not necessary to make thick the resin material as in the conventional technique to seal the surface contacting the mold and it becomes possible to reduce the thickness of the resin material to decrease tension force thereby to prevent heat generation from increasing.

Furthermore, it is characterized in that a helical projection is formed to a lower mold part to be pressed to form a helical groove to the lower surface of the resin material at a time when the inner diameter portion of the flat washer shape resin material is pressed.

It is characterized in that a part of the rubber-like elastic material is moved toward the upper surface side of the inner diameter portion of the resin material pressed from the inside of the mold cavity to form a rubber film thereon.

As described above, by moving a part of the rubber-like elastic material, the rubber-like elastic material easily flows in the mold cavity preventing formation of a defective product of the rubber-like elastic material.

In a case where a part of the rubber-like elastic material is intruded from the inner diameter side of the resin material to the lower surface side thereof through the inner diameter side end thereof, the intruded portion will be cut at the finishing process. However, the sealing device may be used with this intruded portion of the rubber-like elastic material if this portion does not affect on the sealing performance.

BRIEF DESCRIPTION OF THE DRAWING

FIGS. 2 to 7 illustrate manufacturing processes in a compression formation of the sealing device of FIG. 1, in which:

FIG. 2 is a sectional view in which respective parts are set in a lower mold part of a formation mold;

FIG. 3 is an elevational section view showing a vulcanizing process;

FIG. 4 is an elevational section view showing a mold opening process of an upper mold part;

FIG. 5 is an elevational section view showing a process for forming a resin seal lip through bending working of an inner diameter side half portion of a resin material; and FIGS. 6 and 7 are each elevational section views showing a mold releasing process of a mold product.

FIGS. 11 to 16 are views showing structures of various sealing devices of a conventional type.

DETAILED DESCRIPTION OF THE INVENTION

The present invention will be described hereunder with reference to the illustrated embodiments.

Figure 1A:
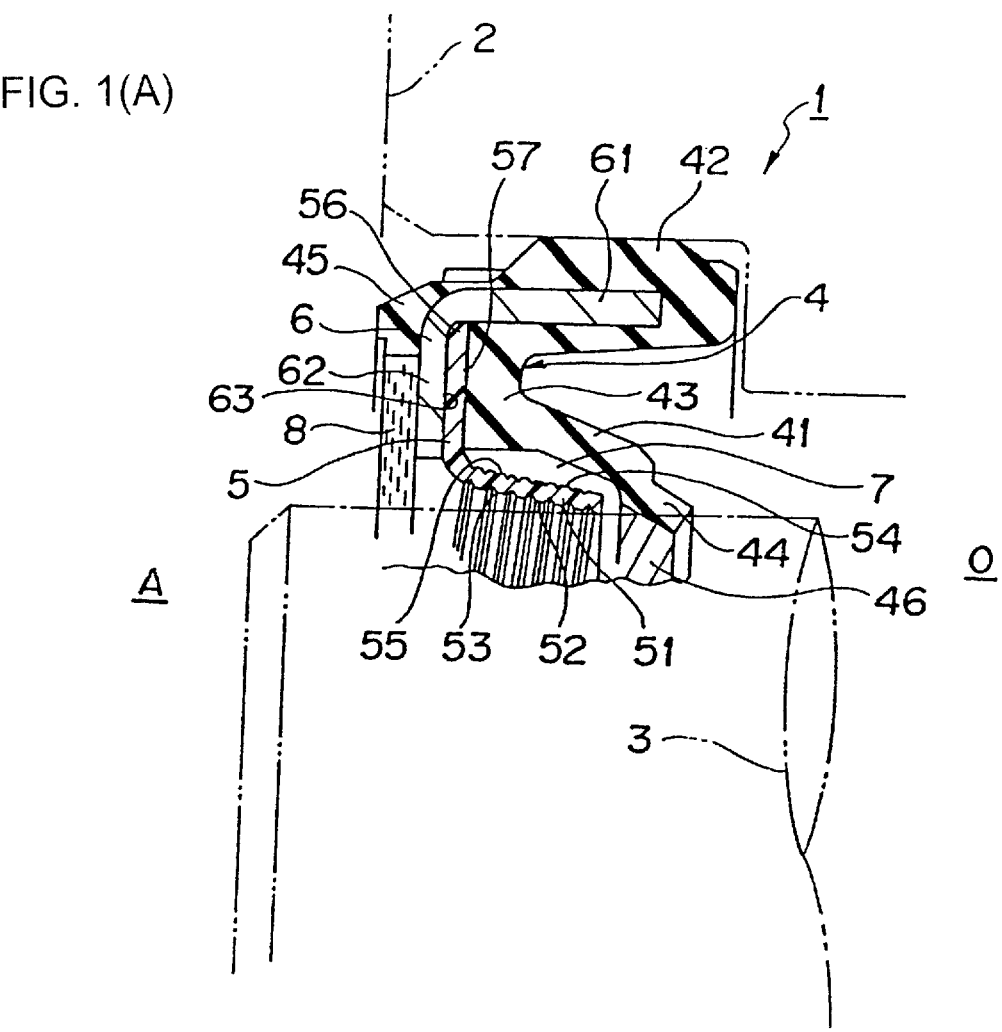
FIG. 1(A) is an elevational section view of a sealing device according to a first embodiment of the present invention and FIG. 1(B) is an elevational section view of an essential portion of a resin seal lip of FIG. 1(A).

Referring to FIG. 1 showing a sealing device according to a first embodiment of the present invention, reference numeral 1 denotes a sealing device. This sealing device 1 is essentially comprises, between a housing 2 and a rotation shaft 3, of an annular first seal member 4 formed with a seal lip 41 of rubber-like elastic material and an annular second seal member 5 formed with a seal lip 51 made of resin material such as PTFE (polytetrafluoroethylene) and disposed on the back surface side of the rubber seal lip 41. An annular space 7 is formed between a bonded base portion 43 of the rubber seal lip 41 and the resin seal lip 51 so that interference of the resin seal lip 51 with the rubber seal lip 41 is prevented.

The first seal member 4 is an annular member having approximately a V-shaped cross section opened to a fluid side 0 to be sealed and is formed of a rubber-like elastic material. An outer one side portion of this V-shape of the first seal member 4 is formed as an outer peripheral seal portion 42 fitted and fixed to an inner periphery of a fitting hole 21 of the housing 2, and an inner one side portion thereof is formed as the rubber seal lip 41 having a lip front end 44 contacting the outer surface of the rotation shaft 3 to be slidable in a fluid-tight condition. A helical groove 46 is formed in the sliding surface of the lip front end 44 for performing a pumping function.

A reinforcing ring 6 made of metal is embedded in the first seal member 4. The reinforcing ring 6 is an annular member having approximately an L-shaped cross section and is composed of a cylindrical portion 61 and an inward flange portion 62 extending radially inward from this cylindrical portion 61. The cylindrical portion 61 is embedded into the outer peripheral seal portion 42 to increase the rigidity thereof, and the inward flange portion 62 is disposed so as to support an atmospheric side surface of a base portion 43 to which the outer peripheral seal portion 42 and the rubber seal lip 41 are bonded.

The second seal member 5 is composed of the resin seal lip 51 having a conical trapezoidal shape surrounding the rotation shaft 3 and a fixed flange portion 56 extending radially inward from a base portion of the resin seal lip 51.

Figure 1B:
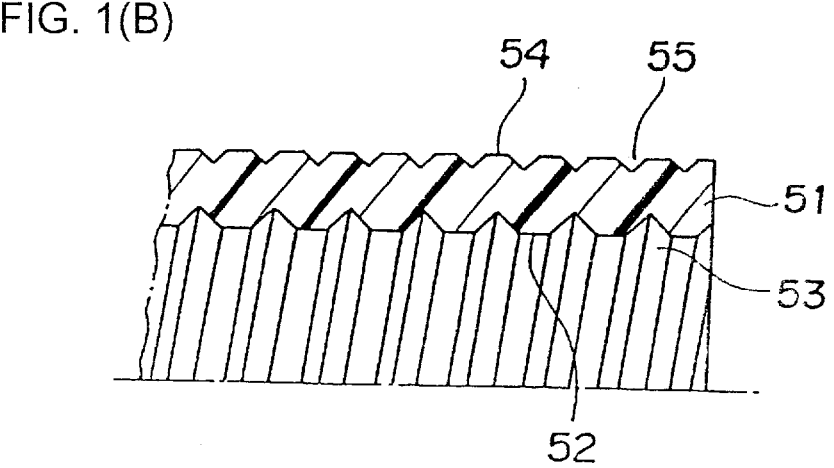

A helical groove 53 is formed in an inner peripheral surface 52 of the resin seal lip 51 entirely from the lip front end to the base portion, and a plurality of annular small grooves 55 are cut-formed to the outer peripheral surface 54 facing the space 7 defined between the rubber seal lip 41 of the first seal member 4 and the resin seal lip 51 in an axially separated manner in parallel with each other (see FIG. 1(B)). Further, it is not always necessary to form the parallel annular groove 55 entirely in the peripheral surface of the resin seal lip 51, as they may be formed discontinuously or may not be formed as occasion demands.

The space 7 defined between the rubber seal lip 41 and the resin seal lip 51 is kept in a non-contacting state to the rubber seal lip 41 throughout the entire length of the resin seal lip 51.

The resin seal lip 51 is disposed with a conical inclination so as to be reduced gradually in its diameter form the inner diameter end of the fixed flange portion 56 to the axial fluid seal side 0 and is bent to the inner side, i.e., the rotation shaft side. The curvature of this bent shape of the resin seal lip 51 is made largest at a bonded base portion 43 thereof and the resin seal lip 51 extends substantially linearly from the bonded base portion 43 towards the front end thereof.

On the other hand, the rubber seal lip 41 is disposed with a conical inclination so as to be reduced gradually in its diameter from the bonded base portion 43 towards the axial fluid seal side, but on the contrary to the case of the resin seal lip 51, the rubber seal lip 41 is bent entirely outward, i.e., in a direction apart from the rotation shaft 3. The inner periphery of the rubber seal lip 41 has a shape extending, at the root portion with the bonded portion 43, towards the axial fluid seal side 0 substantially parallel to the rotation shaft 3, inclining conically towards the lip front end 44 from the way of the extension and projecting inward at the lip front end 44 abutting against the rotation shaft 3 thereby to form a large space between the rotation shaft 3 and the rubber seal lip 41.

As described above, according to this embodiment, since the resin seal lip 51 is bent entirely inward and the rubber seal lip 41 is bent outward, the annular space 7 is formed widely. Particularly, the inner peripheral portion of the rubber seal lip 41 facing the annular space 7 has a shape extending, at its root portion, substantially parallel to the rotation shaft 3, and on the other hand, the root portion of the rubber seal lip 51 is largely bent inward thereby to provide a wide space between the resin seal lip 51 and the bonded base portion 43 of the rubber seal lip 41. Furthermore, since the lip front end 44 of the rubber seal lip 41 projects inward to form a large space between it and the rotation shaft 3, interference of the resin seal lip 51 with the rubber seal lip 41 can be surely avoided.

Further, as described hereinbefore, the flange portion 56 of the second seal member 5 is nip-fixed between the inward flange portion 62 of the reinforcing ring 6 and the bonded base portion 43 of the first seal member 4, and the outer diameter side end surface of the flange portion 56 abuts against the inner peripheral surface of the cylindrical portion 62 of the reinforcing ring 6. The flange portion 56 and the bonded base portion 43 of the first seal member 4 entirely contact each other and this contact surface entirely constitutes a bonded surface 22, at which the rubber-like elastic material is baked and bonded to a resin surface at the molding time of the first seal member 4 as described hereinafter. A bonding agent may be utilized for such surface bonding or the resin material and the rubber material may be bonded without any bonding agent.

Furthermore, the fixed flange portion 56 of the second seal member 5 and the inward flange portion 62 of the reinforcing ring 6 also entirely contact each other, and this contact surface 9 may be glued or bonded, or may merely abut.

Still furthermore, a dust seal fixing member 45, projecting axially on the atmosphere side and made of a rubber-like elastic material, is provided to an entirely outer peripheral surface of an outer corner side of the cylindrical portion 61 of the reinforcing ring 6 and the inward flange portion 62. A washer-like dust seal 8 is fixed to the inner periphery of the dust seal fixing member 45, and the inner diameter side of the dust seal 8 slidably contacts, in a sealed manner, the outer peripheral surface of the rotation shaft 3. The dust seal 8 is formed of a felt material as an annular member rectangular in section, and the dust seal 8 maybe otherwise formed of another seal member such as lip-shaped seal member.

In the sealing device of the structure described above, since the annular space 7 is defined between the rubber seal lip 41 and the resin seal lip 51, the resin seal lip 51 does not interfere with the rubber seal lip 4 thereby to smoothly follow up the operation of the rotation shaft 3, thus improving the follow-up performance.

Furthermore, since the annular groove 54 is formed in the outer peripheral surface of the resin seal lip 51 and the helical groove 52 is formed in the inner peripheral surface thereof, the resin seal lip 51 is easily flexed, thus further improving the follow-up performance. In addition, a helical screw groove 53 is formed to the inner peripheral surface, and the sealing property can be improved by the screw pumping function.

Still furthermore, during manufacturing, as described hereinafter, the intrusion of the rubber-like elastic material can be also prevented by the formation of the annular groove 54.

Still furthermore, since interference of the rubber seal lip 41 can be prevented, the resin seal lip 51 is made stable in dimension and the stable sealing performance can be maintained.

The manufacturing method of the sealing device 1 of the characters described above will be described hereunder with reference to FIGS. 2–7.

The mold 26 is first referred to, and the mold 26 includes a lower mold half 26A of the stationary side and an upper mold half 26B of the movable side.

The lower mold half 26A includes a lower first mold part 20 provided with a stepped portion 20A on which rubber material 4A as a rubber-like elastic material is placed, a lower second mold part 21 to which the reinforcing ring 6 is disposed and a lower third mold part 22 for forming a helical groove by pressing the outer diameter side half portion of a flat washer-shaped sheet 5a made of a resin material such as PTFE. The lower third mold part 22 has an upper surface to which a helical projection 22A for forming the helical groove is formed.

The upper mold half 26B includes an upper first mold part for vulcanizing the rubber material 4A and an upper second mold part 24 for pressing the outer diameter side of the resin sheet 5A in association with the lower third mold part 22 thereby forming the annular grooves to the resin sheet 5A. The upper second mold part 24 has a lower surface to which a plurality of projections 24A for forming the plural annular grooves 55 are concentrically formed. A plate spring 25 is interposed as an urging member between the stepped portions 23A and 24A of the upper first and second mold parts 23 and 24 for urging the upper first and second mold parts 23 and 24 to separate them in the axial direction.

Figure 3:
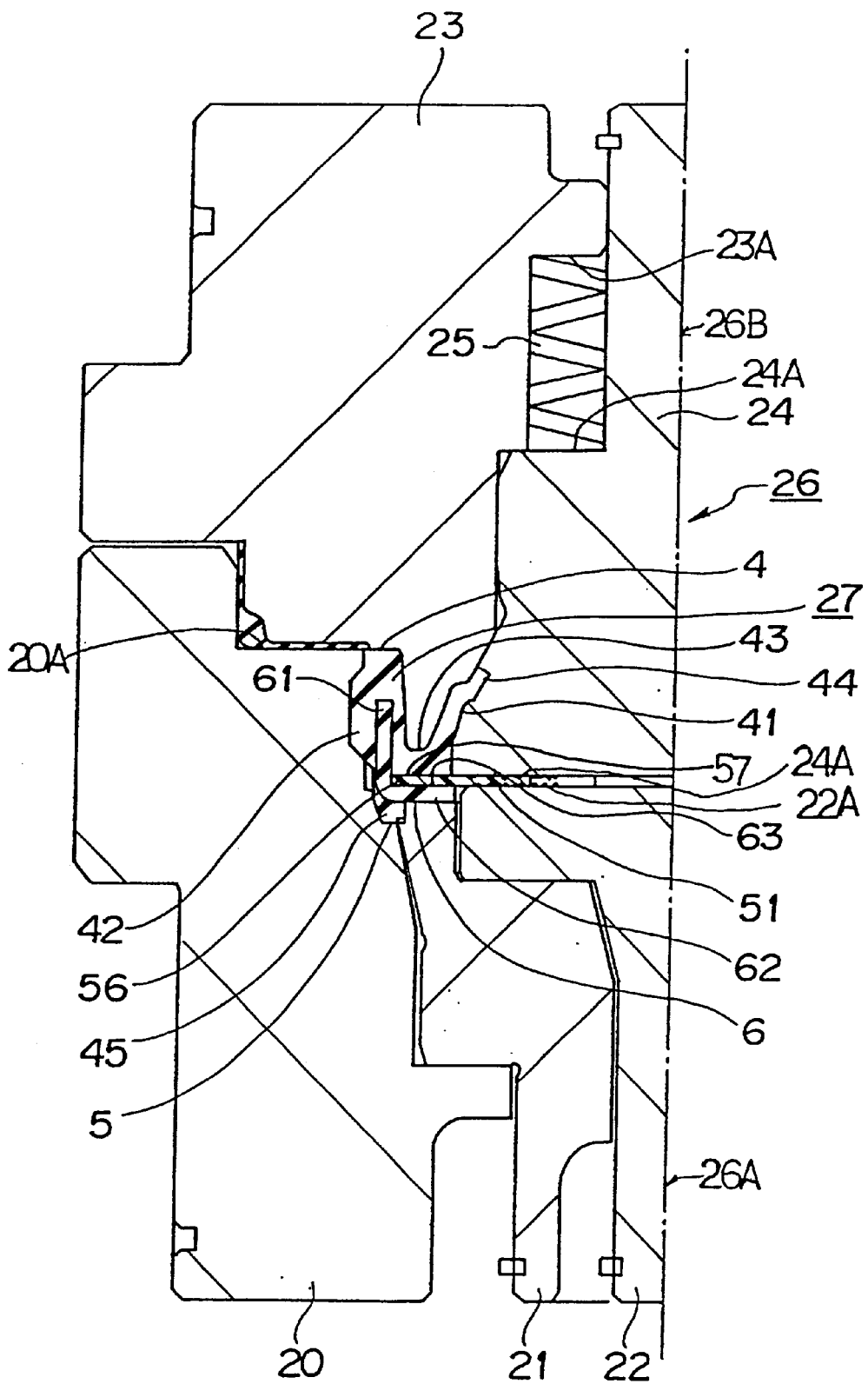

Through the mold clamping process to the upper and lower mold halves 26B and 26A, a mold cavity 27 is formed (see FIG. 3).

Figure 2:
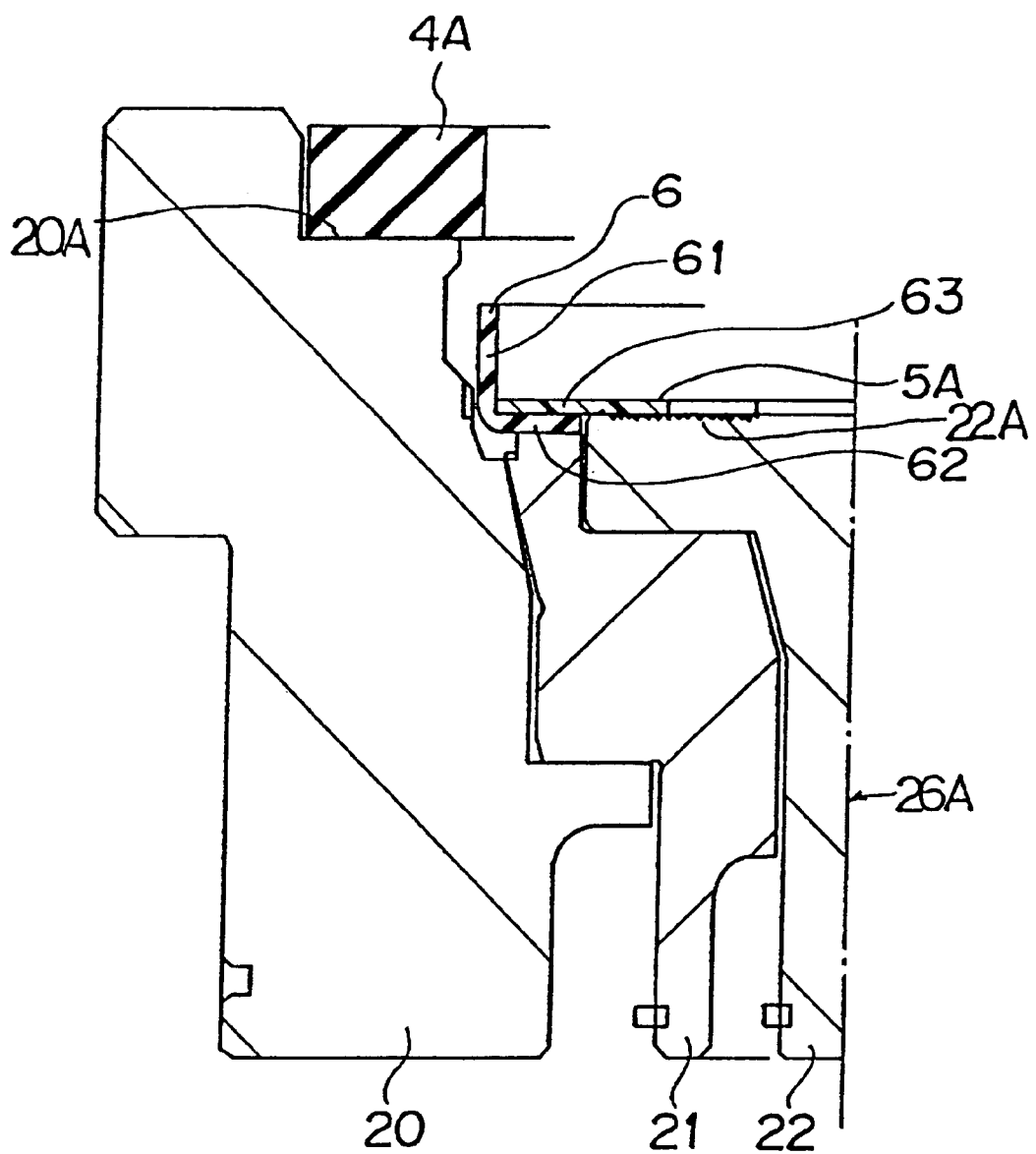

In the molding process of the sealing device 1, as first shown in FIG. 2, the rubber material 4A is placed on the stepped portion 20A of the lower first mold part 20 of the lower mold half 26A now opened, and the reinforcing ring 6 is placed on the upper surface of the lower second mold part 21 with the inward flange portion 62 being directed downward.

Next, the outer diameter side half portion of the preliminarily formed flat washer-shaped resin sheet 5A as resin material is close contacted to the flange surface 63 of the inward flange portion 62 with the inner peripheral surface of the cylindrical portion 61 of the reinforcing ring 6 being a guide for this contacting, and also, the inner diameter side half portion thereof is placed so as to abut against the upper surface of the lower third mold part 22 adjacent to the mold cavity 27, particularly, against the helical projection 22A (see FIG. 2).

Under such setting condition of the reinforcing ring 6 and the resin sheet 5A, the upper and lower mold halves 26B and 26A are clamped by a pressing machine, not shown, and then the rubber material 4A in the mold cavity 27 is heated and pressurized, Although the molding conditions are optionally set in accordance with the dimension of the mold, it will be preferred that the rubber material 4A is pressed by a pressure of about 5–10 tons at a temperature of about 180°–200° C.

Through the processes mentioned above, the fluidized rubber material fills with substantially no gap in the mold cavity 27, and then, the first seal member 4 including the rubber seal lip 41 is molded. At the same time, the rubber material is baked and bonded to the bonding surface 57 of the outer diameter side half portion of the resin sheet 5A. Further, the outer diameter side half portion of the resin sheet 5A is pressed against the inward flange portion 62 of the reinforcing ring 6 through the molding pressure of the rubber material, thereby preventing the intrusion of the rubber material into the lower surface side of the resin sheet 5A.

Furthermore, through the processes mentioned above, the helical screw groove 53 is formed by the helical projection 22A of the lower third mold part 22 to the lower surface of the inner diameter side half portion of the resin sheet 5A by the clamping pressure to the upper second mold part 24 and the lower third mold part 22, and a plurality of small annular grooves 55 parallel with each other are formed in the upper surface of the inner diameter side half portion of the resin sheet 5A by the annular projections 24A formed to the lower surface of the upper second mold part 24. These annular grooves 55 are formed each with a depth of 0.2–0.3 mm (see FIG. 3).

Figure 4:
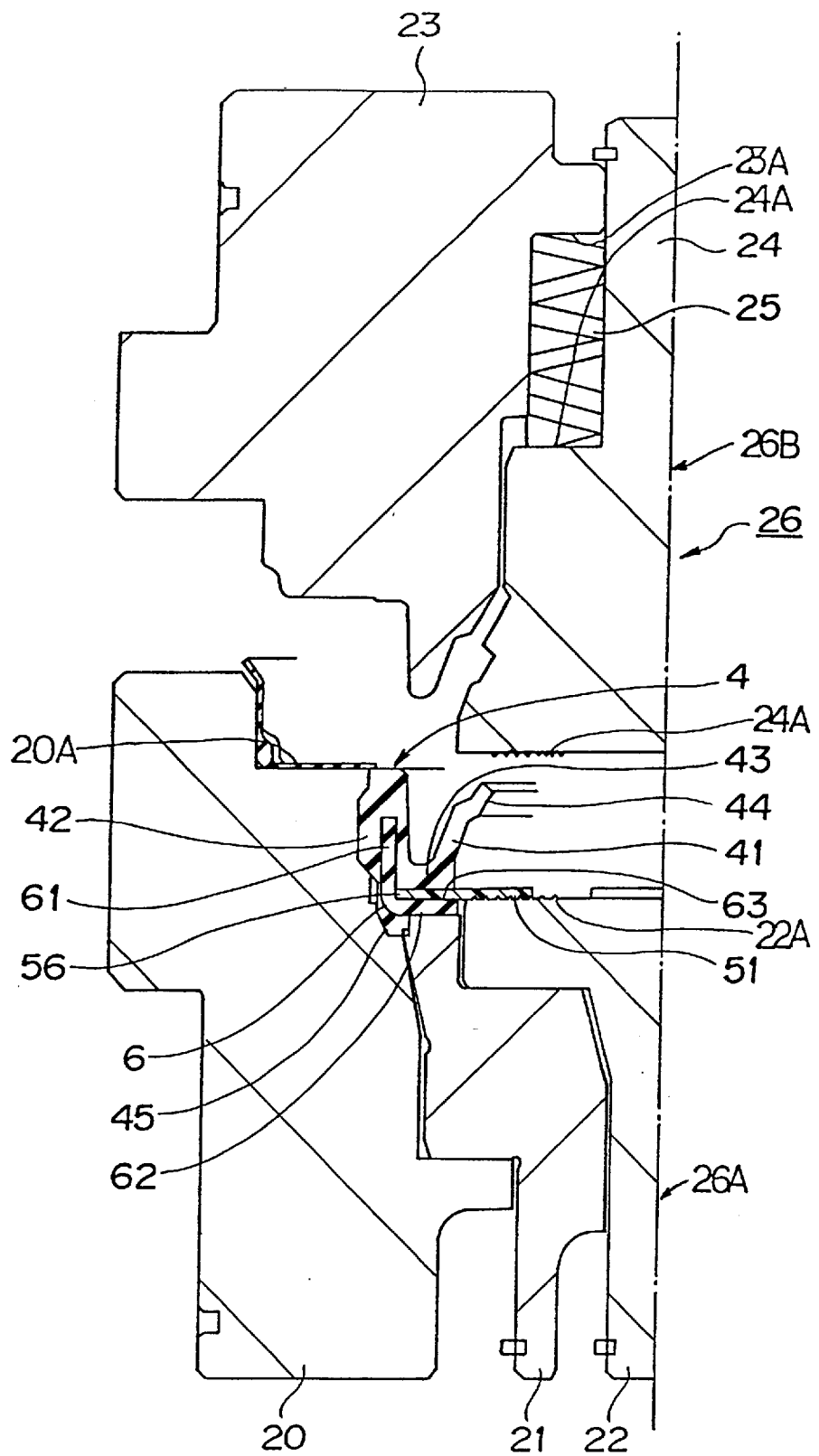

In this time, since the resin sheet 5A is pressed by the annular projection 24A, the intrusion of the rubber material in the mold cavity 27 to the upper surface side of the resin sheet 5A can be prevented. In the described manner, after the completion of the vulcanizing process of the first seal member 4, the upper mold half 26B is released to open the mold as shown in FIG. 4.

Figure 5:
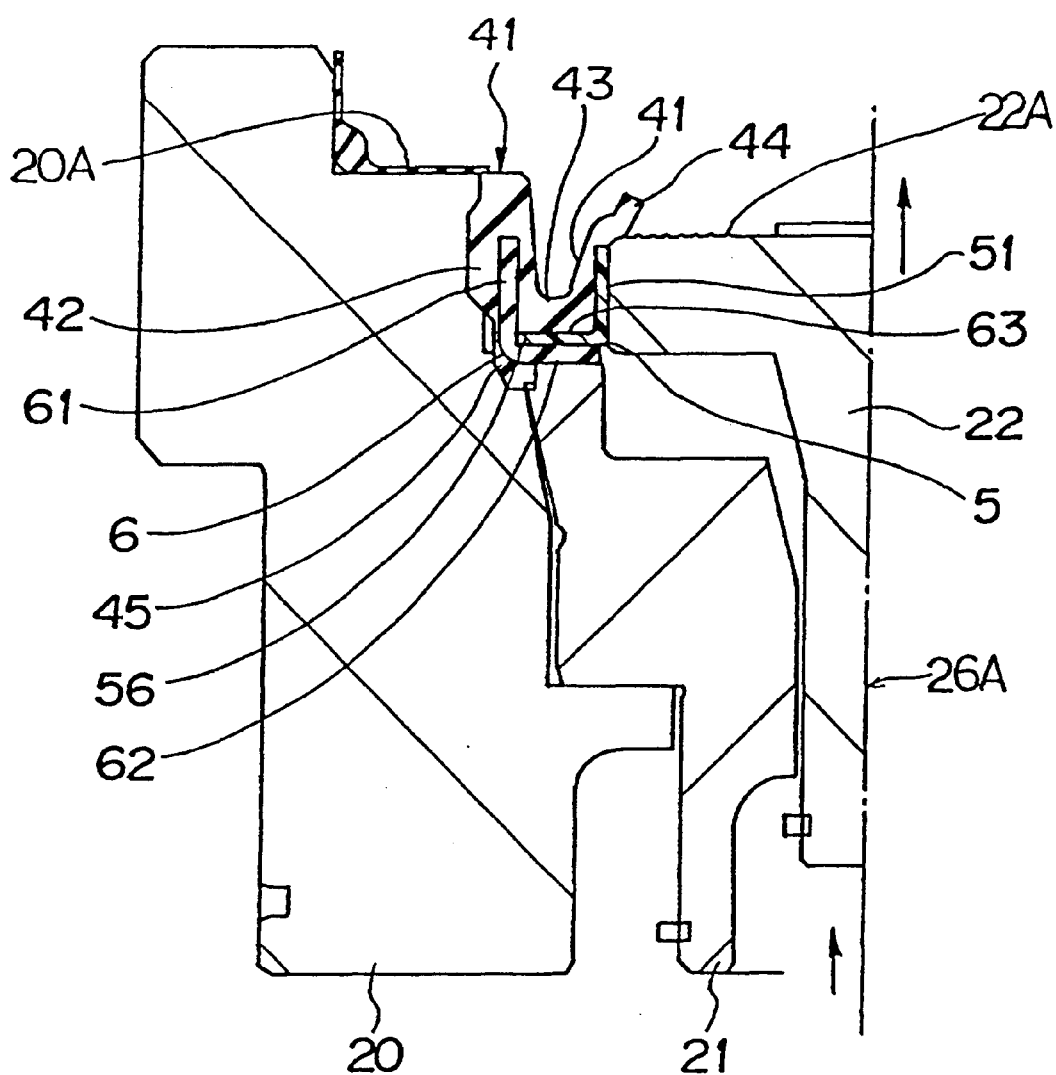

Next, as shown in FIG. 5, the inner diameter side half portion of the resin sheet 5A is bent through the push-up motion of the lower third mold part 22 of the lower mold 26A, thus forming the resin seal lip 5. At this time, since the process is performed under the high temperature condition (180–200° C. in this embodiment), the resin sheet 5A can be easily bent.

Figure 6:
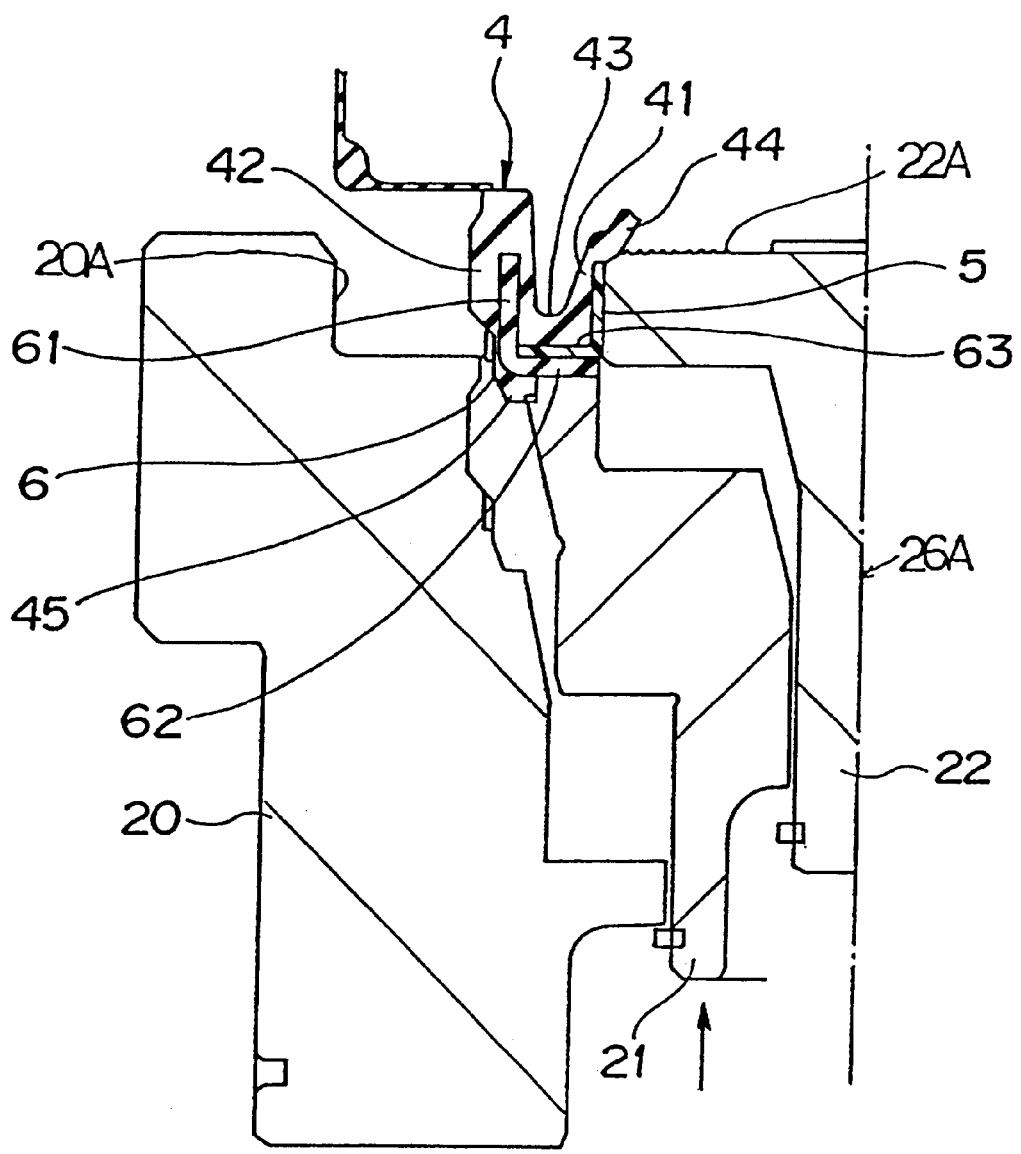
Figure 7:
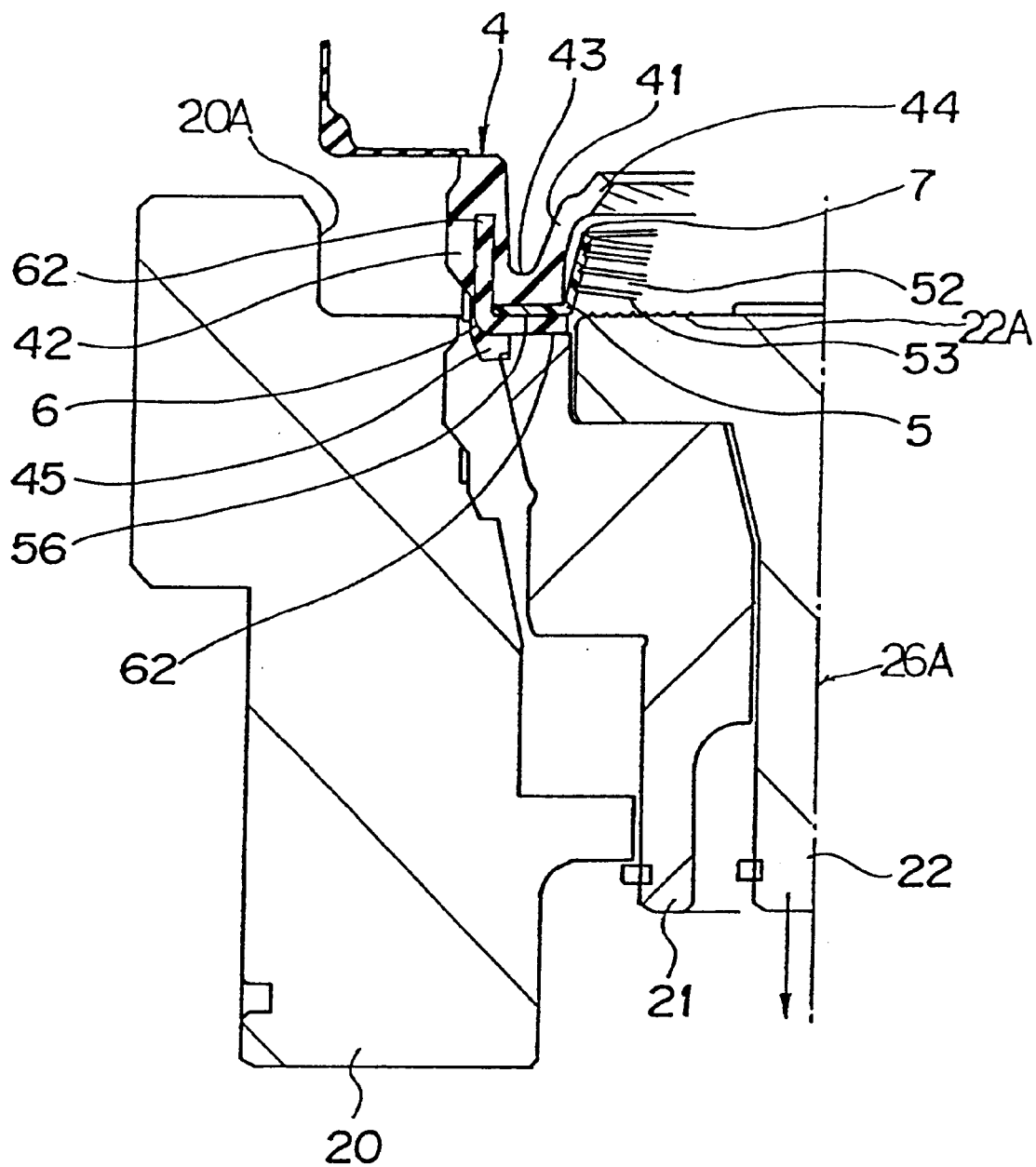

Then, as shown in FIG. 6, the lower second mold part 21 of the lower mold half 26A is pushed up to discharge a product body (see FIG. 6). Thereafter, as shown in FIG. 7, only the lower third mold part 22 is pulled downward, thereby completing the mold separation.

Finally, the bars of rubber material 4A of the thus molded product body are removed, and then, the sealing device 1 is completed by fixing the dust seal member 8 to the inner periphery of the dust seal fixing portion 45 of the rubber seal lip 4.

According to the sealing device 1 manufacturing method described above, since the resin sheet 5A in the form of the flat-washer shape is pressed against the reinforcing ring 6 at the same time of the vulcanization formation of the first seal member 4, the thickness of the resin seal lip 5 can be made thin, and in the thus manufactured product, the intrusion of the rubber material can be prevented and the generation of high heat, which is a defect of the conventional resin seal lip having a large thickness, can also be prevented by making stable the dimension thereof.

Figure 8:
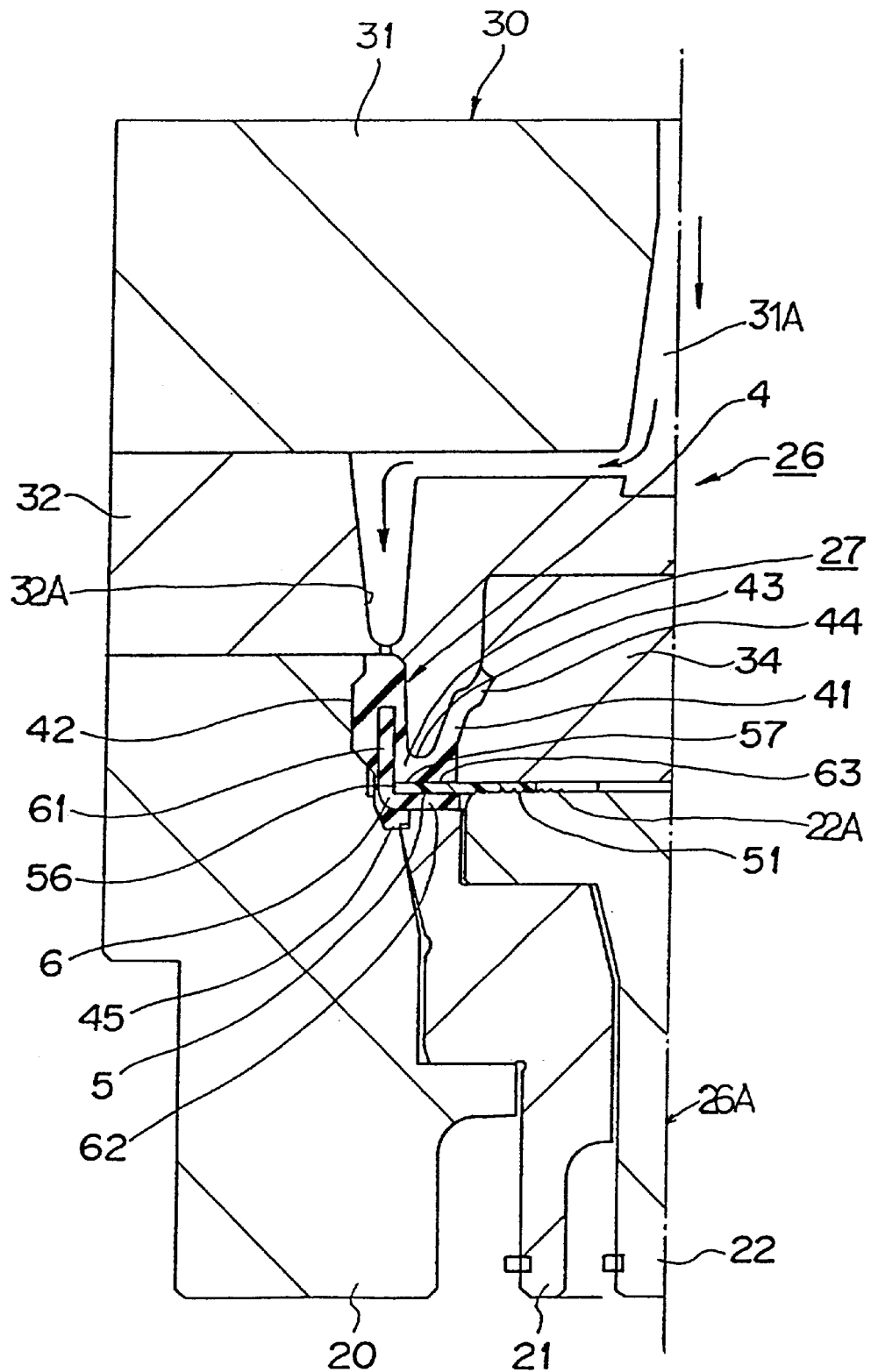
FIG. 8 is an elevational section view of a formation mold in a case where the sealing device of FIG. 1 is injection-molded or transfer-molded.

FIG. 8 is an illustration representing an injection- or transfer-molding method in place of the compression molding shown in FIGS. 2–7. That is, an upper mold half 30 includes an upper first mold part 31 having a passage 31A for flowing the fluidized material 4A into the mold cavity 27, an upper second mold part 32 having a gate 32A communicated with the passage 31A, and an upper third mold part 33 for forming a plurality of annular grooves 55 parallel to one another to the resin sheet 5A. The lower mold half 26A includes substantially the same mold parts as those of the former embodiment, so that the same reference numerals are added to the corresponding portions and the explanation thereof is omitted here.

Figure 9A:
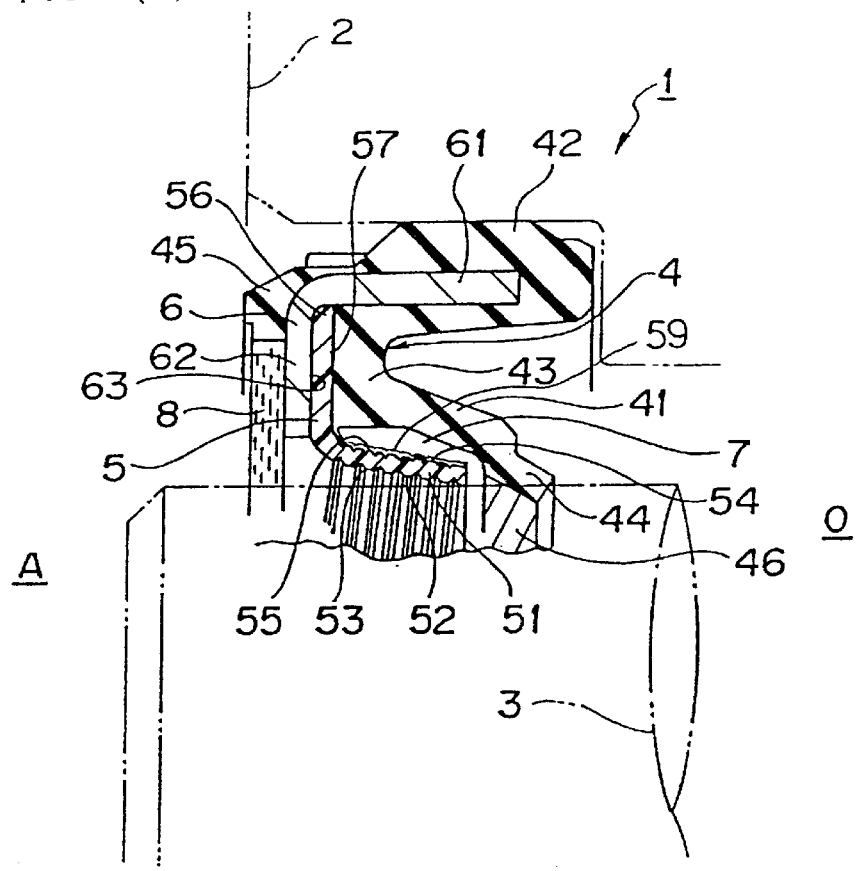
FIG. 9(A) is an elevational section view of a sealing device according to a second embodiment of the present invention and FIGS. 9(B) and 9(C) are elevational section views showing essential portions of the resin seal of FIG. 9(A).
Figure 9B:
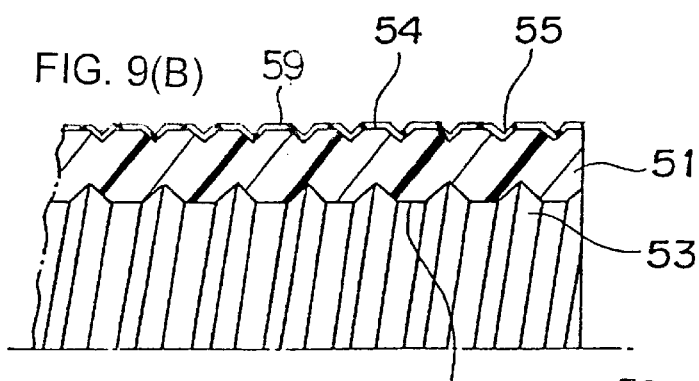
Figure 9C:
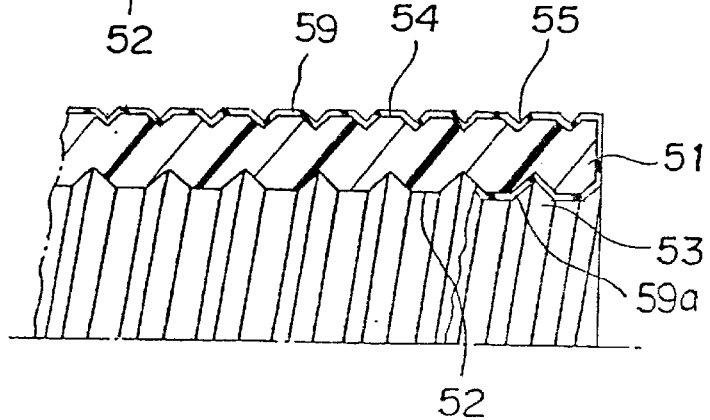

FIG. 9 shows a sealing device according to a second embodiment of the present invention.

As this embodiment is basically identical to that of the first embodiment, the same reference numerals are added to the corresponding portions and the explanation thereof is omitted here, and only the structures different from those of the first embodiment will be explained hereunder.

In the second embodiment, as constructed in the first embodiment, the interference between the resin seal lip 51 and the rubber seal lip 41 are prevented by defining the annular space 7, and the helical groove 53 is formed in the inner periphery of the resin seal lip 51 and the plurality of annular grooves 55 are also formed in the outer periphery in parallel with one another. However, this second embodiment is different from the first embodiment in that the rubber material is supplied to the side surface facing the annular space 7 of the resin seal lip 51 to cover the same with a thin rubber film 59. This rubber film 59 extends continuously from the bonded base portion 43 of the first seal member 4.

A plurality of small annular grooves 55 are formed in parallel with each other to this side surface of the resin seal lip 51 to be covered with the rubber film 59 as in the first embodiment and the rubber film 59 is covered on the annular grooves 55.

In this second embodiment, it may be possible to make flat the upper surface of the resin sheet 4A without forming such a plurality of annular grooves 55 and to supply the rubber material thereon. According to this embodiment, contrary to the prior art on which the resin sheet 4A is made thick to prevent the intrusion of the rubber material, the rubber material is positively supplied on the upper surface of the resin sheet 4A, so that the resin sheet 4A can be made relatively thin.

The manufacturing method of the sealing device 1 of the second embodiment is substantially the same as that of the present invention described with reference to FIGS. 2–8, but is different in a process in which a clearance between the lower third mold half part 22 and the upper second mold part 24 for pressing the resin sheet 4A is formed so that the rubber material intrudes a gap between the upper surface of the resin sheet 4A and the lower surface of the lower second mold part 24. Although in the first embodiment, the upper and lower surfaces of the resin sheet 4A are pressed in close contact between the second upper mold part 24 and the lower third mold part 22, in the second embodiment, a gap is formed.

In the manner described above, the rubber material is supplied on the upper surface of the inner diameter half portion of the resin sheet 4A and a plurality of annular grooves 55 are pressurized and formed in the upper surface thereof.

As described above, since the space in which the rubber material flows can be made wide also together with the mold cavity 27 by forming such a gap, the flow of the rubber material can be rectified and hence stabilized.

Figure 10:
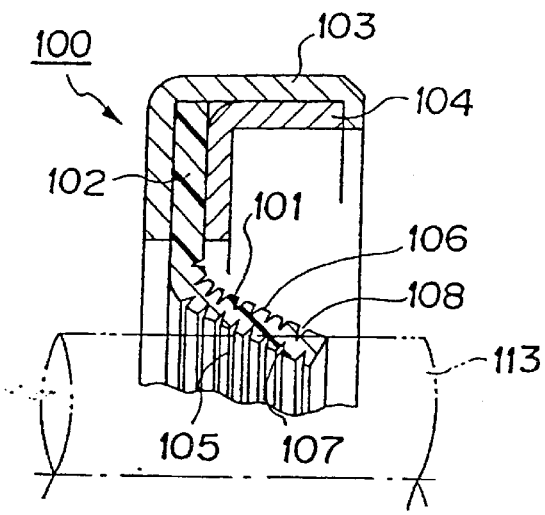
FIG. 10 is prior art showing a state in which a rubber is moved on an upper surface of a resin sheet in a pressurizing and heating process.
Figure 11:
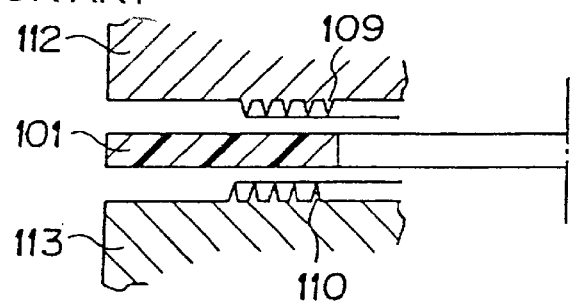
Figure 12:
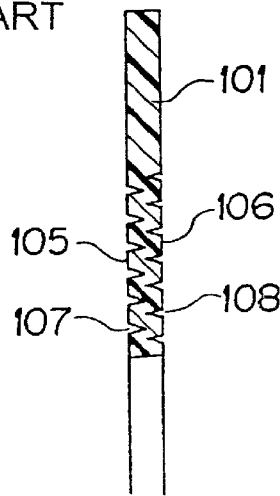
Figure 13:
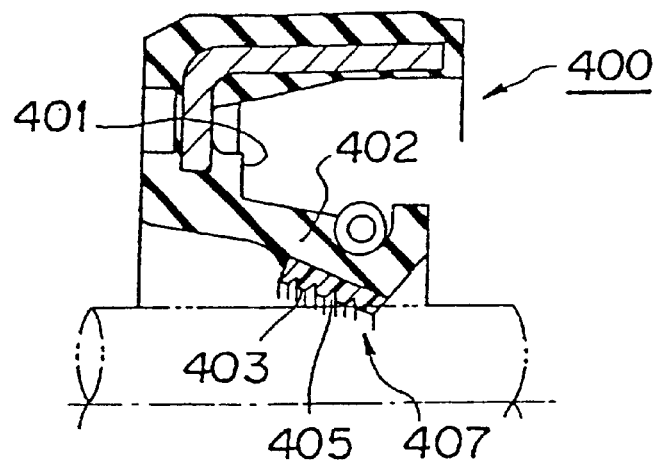
Figure 14:
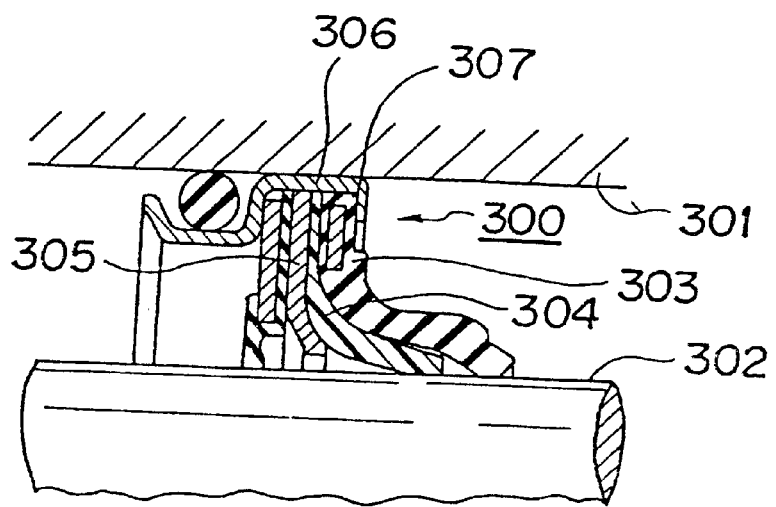

On the other hand, as shown in FIG. 10(C), in a case where the rubber material 59a is moved from the inner diameter side end of the resin sheet 4A towards the helical groove 53 on the lower surface side, the thus moved rubber material portion at the front end of the resin seal lip 51 is cut in the finishing process after the mold separation, whereby a suitable resin seal lip 51 can be obtained. This cutting can be made obliquely as shown by an arrow in FIG. 10(C), but the cutting may be done in a right angle and, otherwise, the moved rubber material portion may be left as it is in a case where that portion does not affect the sealing performance.

Possibility of Industrial Usage

According to the present invention, since the rubber seal lip and the resin seal lip are separated by a space so as not to interfere with each other, the resin seal lip can follow up the rotation of the rotation shaft with substantially no stress and the sealing performance can be hence stabilized. Accordingly, the sealing device can be utilized for sealing a portion to which a stable sealing performance is required for a long term under a severe condition.

Particularly, the follow-up performance can be remarkably improved by the groove formation to the resin seal lip.

Furthermore, since the resin seal lip can be made thin, tension force is reduced and heat generation can be hence lowered.

According to the manufacturing method of the present invention, in the molding process of the first seal member for a compound type sealing device, the integral bonding working of the second seal member and the bending working of the resin seal lip can be performed in the same process at the same time, thus realizing the extremely improved productivity of the sealing device.

Furthermore, since a portion to be formed as a flat washer shaped resin seal lip is disposed outside of the mold cavity and formed there, the dimensions of the rubber seal lip and the resin seal lip can be made stable.

Still furthermore, it becomes possible to prevent the rubber seal member bonded portion from intruding toward the upper surfaces of the upper and lower mold halves adjacent to the mold cavity.

What is claimed is:

1. A method of manufacturing a sealing device, comprising the steps of:

preparing a mold for molding of both a rubber-like elastic material and a resin material, the resin material having a flat washer shape;

inserting an outer diameter portion of the flat washer shape resin material into a mold cavity of said mold, and adhesively baking the rubber-like elastic material to the outer diameter portion of the flat washer shape resin material, together with the molding of the rubber-like elastic material to form a rubber seal lip;

pressing an inner diameter portion of the flat washer shape resin material by a mold part adjacent the mold cavity in utilization of a mold clamping pressure;

bending the pressed inner diameter portion of the flat washer shape resin material, by a mold part of said mold to form a resin seal lip, arranged such that an annular space is formed between a bonded base portion of the rubber seal lip and the resin seal lip so that interference of the resin seal lip with the rubber seal lip is prevented; and separating a sealing device from said mold.

2. The sealing device manufacturing method according to claim 1, wherein an annular projection is formed on an upper mold pat to be pressed to form an annular groove in an upper surface of the resin material at a time when the inner diameter portion of the flat washer shape resin material is pressed.

3. The sealing device manufacturing method according to claim 2, wherein a helical projection is formed on a lower mold part to be pressed to form a helical groove in a lower surface of the resin material at a time when the inner diameter portion of the flat washer shape resin material is pressed.

4. The sealing device manufacturing method according to claim 1, wherein a part of the rubber-like elastic material is moved toward an upper surface of the inner diameter portion of the resin material pressed from the inside of the mold cavity to form a rubber film thereon.

* * * * *

UNITED STATES PATENT AND TRADEMARK OFFICE
CERTIFICATE OF CORRECTION

PATENT NO.    : 6,660,206 B1
DATED         : December 9, 2003
INVENTOR(S)   : Noboru Matsushima et al.

It is certified that error appears in the above-identified patent and that said Letters Patent is hereby corrected as shown below:

Title page,
Item [73], Assignee, change "Fukushima" to -- Tokyo --.

Signed and Sealed this

Fifteenth Day of February, 2005

JON W. DUDAS
*Director of the United States Patent and Trademark Office*